July 23, 1929.  H. A. DAVIS  1,722,243
FILLING REPLENISHING LOOM
Filed Aug. 2, 1928
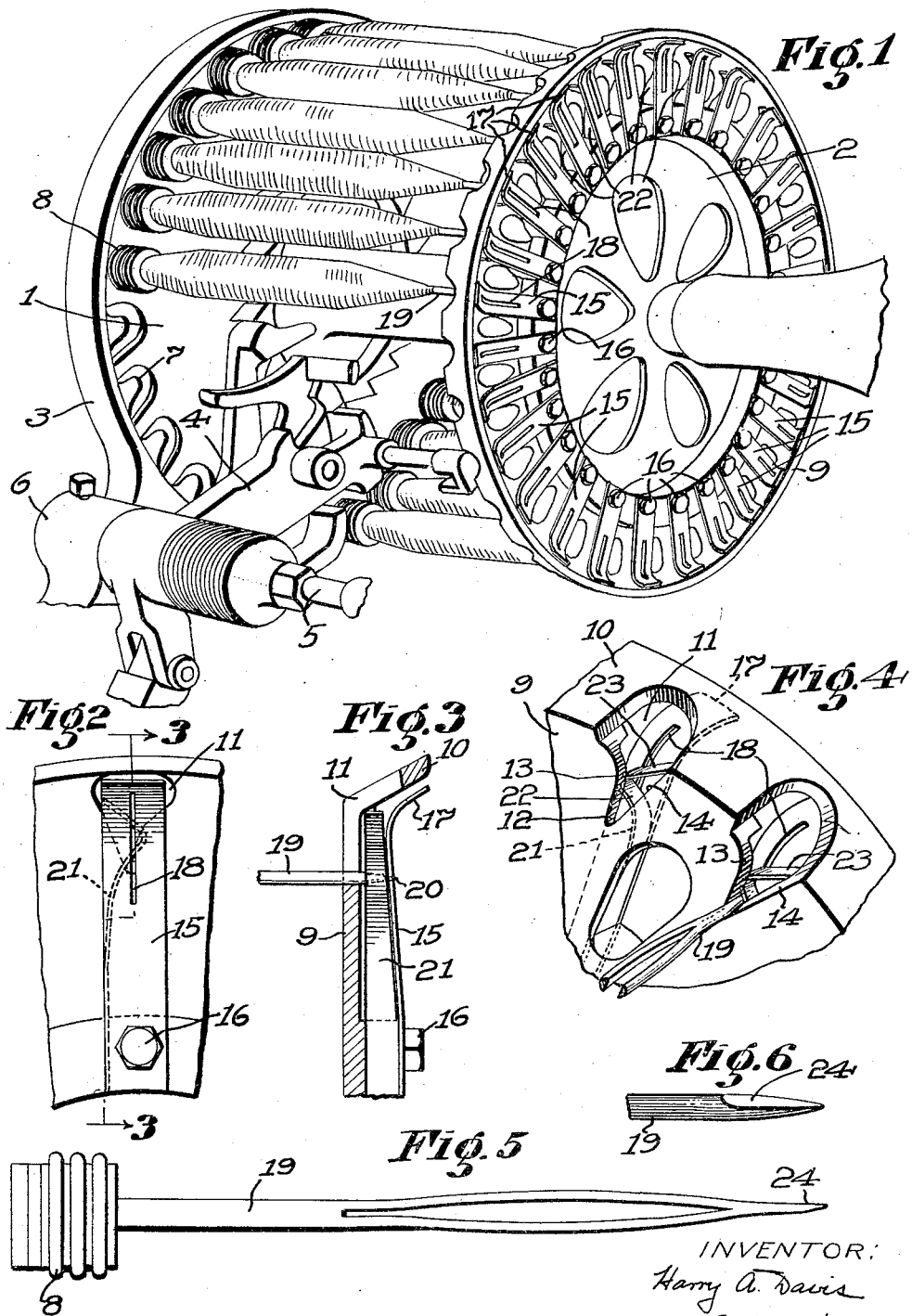
INVENTOR:
Harry A. Davis
BY Robt. P. Hains
ATTORNEY Patented July 23, 1929.

1,722,243

UNITED STATES PATENT OFFICE.

HARRY A. DAVIS, OF HOPEDALE, MASSACHUSETTS, ASSIGNOR TO DRAPER CORPORATION, OF HOPEDALE, MASSACHUSETTS, A CORPORATION OF MAINE.

FILLING-REPLENISHING LOOM.

Application filed August 2, 1928. Serial No. 297,007.

This invention relates to filling replenishing looms wherein the filling in the shuttle is changed from time to time, and is more particularly directed to the means for holding the filling carriers in the filling feeder or magazine.

It is now the ordinary practice to provide filling replenishing looms with a rotary filling feeder or magazine for the support of the loaded filling carriers which are to be transferred to the shuttle, and such filling feeders or magazines have usually been provided with means for holding the heads and tips of the filling carriers while in the hopper and yet permit the filling carriers to be transferred from the hopper to the shuttle.

Where the filling carriers are of the cop skewer type, the tip end portion of the cop skewer is liable to be burred or roughened when the cop skewers are placed in the feeder or magazine, and likewise when they are transferred to the shuttle, and since the filling is withdrawn from the cop skewer lengthwise thereof, this burred or roughened end portion is liable to chafe or injure the filling during weaving, and in some cases cause breakage thereof. It is not expedient, therefore, to support filling carriers of this type in the filling feeder or magazine in accordance with the usual methods, and the object and purposes of the present invention are to provide a tip support for filling carriers, especially of the cop skewer type, which will be effective in maintaining the cop skewers in proper position in the feeder or magazine and at the same time avoid any injury to the end of the filling carrier, either while it is being placed in the hopper or transferred therefrom.

In accordance with the present invention, the tip holding disk of the rotary hopper is provided with seats which engage the filling carrier near its tip end portion and serve to position the filling carrier for transfer, while in connection therewith there are trip engaging members having slots longitudinally thereof through which the pointed end of the tip of the filling carrier may extend so that it will not be injured. Cooperating with the seats of the tip holding disk and the tip engaging members are a series of retainers which serve to maintain or hold the tip portions of the filling carriers in the seats of the disk and which yield for the entrance and exit of the filling carriers, without injury to the tip portions thereof.

It is desirable in most cases to insure that filling carriers shall not rotate on their longitudinal axes while in the hopper, and to this end the present invention provides a simple but effective expedient of a slabbed-off portion of the filling carrier or skewer at the tip thereof, which in cooperation with the walls of the tip seats in the disk serve the desired purpose.

The invention and new combination of parts and novel features thereof will best be made clear from the following description and the accompanying drawings of one good practical form of the invention.

In the drawings:

Fig. 1 is a perspective view of a rotary filling feeder or magazine containing the present invention;

Fig. 2 is an enlarged detail view of a section of the tip holding disk looking from the right, Fig. 1;

Fig. 3 is a section on the line 3—3 of Fig. 2;

Fig. 4 shows a portion of the tip holding disk and the features of the invention associated therewith;

Fig. 5 is a side view of a cop skewer which may constitute the type of the filling carrier employed in the filling feeder or magazine; and Fig. 6 is a detail showing the slabbed-off end portion of the cop skewer or filling carrier.

The rotary filling feeder or magazine comprises the head disk 1 and the tip holding disk 2 which, in their associated relation, are mounted for rotary movement upon a stand 3 which may be conveniently supported upon the loom frame at the filling replenishing side thereof. The transferring mechanism by which the filling carriers are transferred from the filling feeder or magazine to the shuttle from time to time may be of any usual construction and as herein shown comprises the transferrer 4 mounted upon a stud 5 supported from the hub portion 6 of the stand, but since the details of the transferring mechanism and actuating means therefor form no part of the present invention and are now well understood in the art, further illustration and description thereof is unnecessary.

The head disk 1 is, as usual, provided with supports 7 for the head portions 8 of the filling carriers and these may be of well-known construction.

The tip holding disk 9 is mounted for rotary movement with the head disk 1, as usual, and its outer peripheral portion is provided with a flange 10 extending axially of the feeder or magazine. The tip holding disk 9 has a series of openings 11 which terminate at their lower portions in seats 12 for the tip end of the filling carriers, and in order that the filling carriers or cop skewers may be readily placed in engagement with the seats 12, the openings 11 are enlarged at the upper portion, as indicated in Fig. 4, and the side walls 13 and 14 thereof converge downwardly and form at their lower union the seats 12 for the filling carriers, the construction being such that the filling carriers may be conveniently assembled with their tip portions in engagement with the seats 12 in the tip holding disk.

Mounted upon the tip holding disk 9 at the outer side thereof are a series of tip engaging members 15 whch may be secured to the tip holding disk by suitable means, such as the bolts 16, and each of the tip engaging members 15 is yieldable or resilient. The tip engaging members 15 have their upper end portions flaring, as at 17, and are each provided wth a slot 18 which extends longitudinally of the tip engaging members. Since it is desirable that the extreme point or tip of the filling carriers or skewers shall not be injured as they are placed in the feeder or magazine and when they are transferred therefrom, the slots 18 are carried upwardly into the flaring portion of the tip engaging members, and through such slots the tip end portions of the filling carriers 19 project, as indicated at 20, Fig. 3.

The slots 18 of the tip engaging members are of less width than the diameter of the filling carriers or cop skewers, so that the cop skewers themselves, while having their pointed tip ends 20 extending through the slots, are, nevertheless, under longitudinal stress, by reason of the engagement of the walls of the slots 18 with the tapering tip end portion of the skewers or filling carriers.

Associated with the tip holding disk 9 are a series of tip retainers 21 which may be suitably secured to the tip holding disk, preferably between the disk and the tip engaging members 15. The tip retainers 21 serve to hold or maintain the tips of the filling carriers or skewers in the seats of the disk and to this end the upper portions of the retainers are reversely formed to provide a portion 22 which acts laterally of the filling carriers and overlies the tip portions thereof between the tip engaging members 15 and the tip holding disk. The extreme upper portion of the retainers 21 is reversely turned, as at 23, so that when a filling carrier has its tip portion engaged with the opening 11 and is forced downwardly towards its seat 12, the cooperating retainer 21 will yield laterally to permit the tip to pass and then move into its original position to thereafter retain or hold the tip end of the filling carrier properly seated in position for transfer.

From the construction thus far described it will be apparent that a filling carrier, such, for instance, as a cop skewer, may have its tip portion engaged with the longitudinal slot 18 of the tip engaging member 15 and then be forced downwardly past the associated retainer 21 into its seat 12 in the disk, without danger of causing a burred or roughened surface to be formed on the pointed end of the filling carrier or cop skewer. Similarly, during transfer, the filling carrier or cop skewer may be transferred from the hopper to the shuttle without danger of burring or roughening the pointed tip end of the filling carrier or skewer.

In order that the cop skewer or filling carrier may act upon the associated retainer 21 to deflect it laterally as the cop skewer is seated, one of the walls, as 13, of the opening 11, is projected laterally, with the result that it will cause the cop skewer to bear upon the upwardly flaring portion 23 of the retainer and move it laterally until, when the tip of the skewer or filling carrier has passed the retainer, the latter will move back to its original position and thereafter maintain the cop skewer or filling carrier in its seat 12 of the disk.

Inasmuch as one of the functions of the tip engaging members 15 is to act with stress longitudinally of the filling carriers or cop skewers, the slots 18 in the tip engaging members 15 are so proportioned with respect to the diameter of the filling carrier or cop skewer that the extreme or tip end of the filling carrier or cop skewer may project through the slot and the walls of the slot thereafter engage the substantially conical end of the filling carrier or skewer and impart longitudinal stress thereto.

As hereinbefore mentioned, it is desirable that the cop skewers or filling carriers shall not turn about their longitudinal axes when in the hopper, and as indicated in Figs. 5 and 6, the tip portion of the filling carrier or cop skewer 19 is slabbed-off, as at 24, with the result that when the cop skewer or filling carrier has been moved downwardly in the slot 11 into engagement with its seat 12, the wall of the seat which embraces the cop skewer or filling carrier will engage the slabbed-off portion 24 and thereafter prevent any rotary movement of the filling carrier or cop skewer in the hopper.

What is claimed is:

1. A rotary filling feeder or magazine having a series of supports for the heads of filling carriers, a tip holding disk having a complementary series of seats for the tip portions of filling carriers, a series of tip end engaging members acting yieldingly in a direction longitudinally of the filling carriers and having slots through which the tips of filling carriers extend, and yieldable retainers for holding the filling carriers to the seats of the disk in position for transfer.

2. A rotary filling feeder or magazine having a series of supports for the heads of filling carriers, a tip holding disk having a complementary series of seats opening radially of the disk for the tip portions of filling carriers, a series of tip end engaging members acting yieldingly in a direction longitudinally of the filling carriers and having slots through which the tips of filling carriers extend, and yieldable retainers for holding the filling carriers to the seats of the disk in position for transfer.

3. A rotary filling feeder or magazine having a series of supports for filling carriers, a tip holding disk having a complementary series of seats the walls of which embrace the tip portions of filling carriers to position them for transfer, a series of tip end engaging members acting yieldingly in a direction longitudinally of the filling carriers, and a series of yieldable retainers acting transversely of the filling carriers between the seats and tip engaging members and having reversely extending inclined portions to permit entrance of the tip end portions of the filling carriers to their seats and acting upon the tip portions of the filling carriers to hold them in the seats of the disk.

4. A rotary filling feeder or magazine having a series of supports for filling carriers, a tip holding disk having a complementary series of seats the walls of which embrace the tip portions of filling carriers to position them for transfer, a series of tip engaging members acting yieldingly in a direction longitudinally of the filling carriers and having slots through which the tip points of filling carriers extend, and a series of retainers for holding the filling carriers in the seats of the disk.

5. A rotary filling feeder or magazine having a series of supports for the heads of filling carriers, a tip holding disk having a complementary series of radially flaring seats for positioning the tips of filling carriers for transfer, a series of tip engaging members acting yieldingly in a direction longitudinally of the filling carriers and provided with slots of less width than the diameter of the filling carriers into which the pointed ends of the filling carriers extend, and a series of retainers mounted independent of the tip engaging members for retaining the tips of fillings carriers in the seats of the disk.

6. A rotary filling feeder or magazine having a series of supports for the heads of filling carriers, a tip holding disk having a complementary series of radially flaring seats for positioning the tips of filling carriers for transfer, a series of tip engaging members acting yieldingly in a direction longitudinally of the filling carriers and provided with slots of less width than the diameter of the filling carriers into which the pointed ends of the filling carriers extend, and a series of retainers acting on the tips of the filling carriers between the disk and tip engaging members for retaining the tips in the seats of the disk.

7. A rotary filling feeder or magazine having a series of supports for the heads of filling carriers, a tip holding disk having a complementary series of tip positioning seats, provided with rigid side walls which converge from the periphery of the disk for directing the tip of the filling carriers to the seats, and a series of yieldable tip retainers having portions reversely inclined laterally of the filling carriers and forming an overlying bulge tipward of the seats for holding the tips of filling carriers in their seats ready for transfer.

8. A rotary filling feeder or magazine having a series of supports for the heads of filling carriers, a tip holding disk having a complementary series of tip positioning seats, the side walls of which converge from the periphery of the disk for directing the tip of the filling carriers to the seats, a series of yieldable tip retainers for holding the tips of filling carriers in their seats ready for transfer, and a series of tip engaging members yieldingly acting longitudinally of the filling carriers and provided with slots of less width than the diameter of the filling carriers.

9. A rotary filling feeder or magazine having a series of supports for the heads of filling carriers, a tip holding disk having a complementary series of tip positioning seats, the side walls of which converge from the periphery of the disk for directing the tip of the filling carriers to the seats, a series of yieldable tip retainers for holding the tips of filling carriers in their seats ready for transfer, and a series of outwardly flaring yieldable tip engaging members provided with slots of less width than the diameter of the filling carriers and through which the pointed ends of the filling carriers extend.

10. A rotary filling feeder or magazine having a series of supports for the heads of cop skewers, a tip holding disk provided with a series of tip openings forming tip engaging seats, and a series of cop skewers having slabbed-off tip portions adapted to be engaged by a wall of the tip openings to prevent rotary movement of the filling carriers in the magazine or feeder and a series of outwardly flaring yieldable tip engaging members acting longitudinally of the cop skewers to retain the slabbed off portion of the skewers in the seats of the tip holding disk.

11. A rotary filling feeder or magazine having a series of supports for the heads of filling carriers, a tip holding disk provided with a complementary series of openings forming tip positioning seats, a series of tip engaging members having slots of less width than the diameter of the filling carriers and through which the pointed ends of the carriers extend, and a series of yieldable tip retainers which yield for the passage of the tips of filling carriers to the seats in the disk and thereafter hold the tips of the carriers in their seats.

In testimony whereof, I have signed my name to this specification.

HARRY A. DAVIS.